Sept. 17, 1940.   M. S. CARMICHAEL ET AL   2,214,736
APPARATUS FOR DISTRIBUTING MATERIALS
Filed March 30, 1936
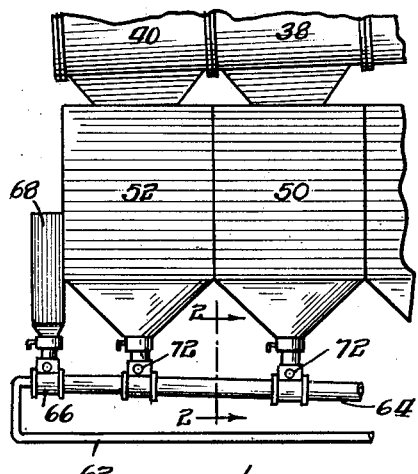
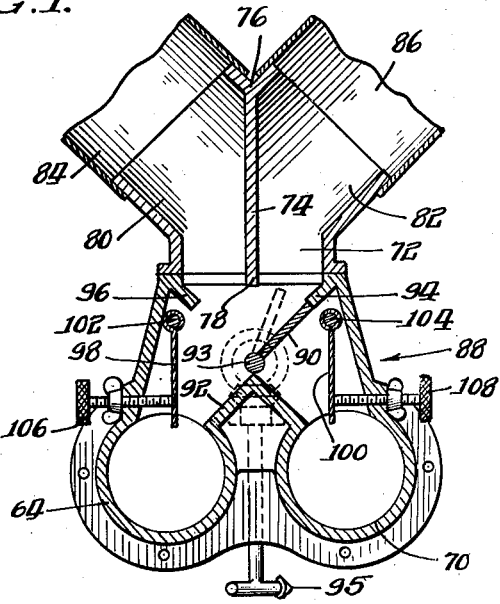
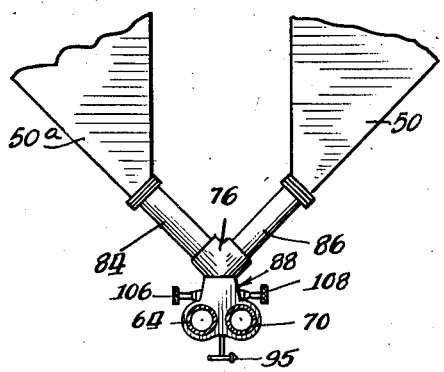
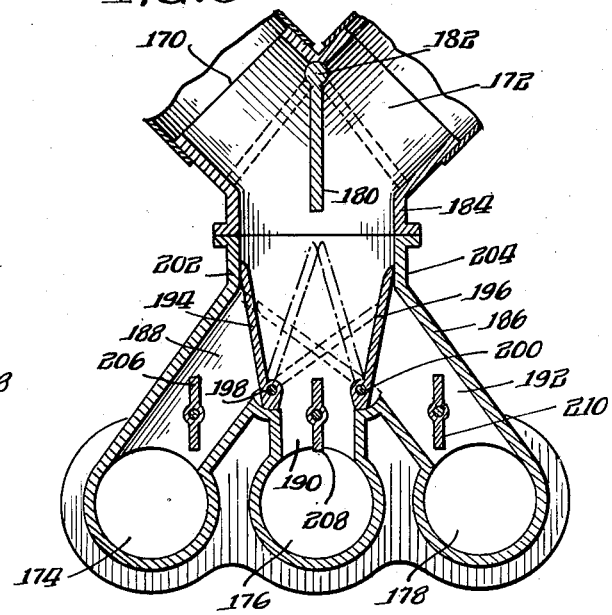
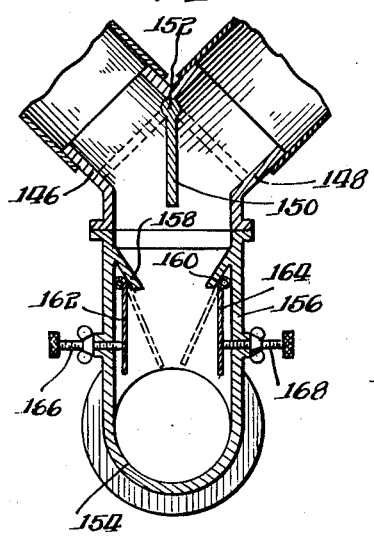
INVENTOR.
Mead S. Carmichael
George W. Carmichael
By:- Cox & Moore ATTORNEYS.

Patented Sept. 17, 1940

2,214,736

UNITED STATES PATENT OFFICE 2,214,736

APPARATUS FOR DISTRIBUTING MATERIALS

Mead S. Carmichael and George Carmichael, Columbus, Ohio

Application March 30, 1936, Serial No. 71,640

6 Claims. (Cl. 302—15)

The present invention relates to an apparatus for feeding and distributing stored material of one or more kinds or types to one or more apparatuses in which such material is to be treated. The invention particularly deals with a conduit system for the transportation or conveyance of such material by fluid or liquid media.

An object of the invention generally stated is to provide a distributing system for food materials such as peas or the like, wherein means is provided for directing the material from a pair or more of material supplying hoppers or sources into a common passage and means is provided for selectively directing the material from said common passage into any one of a plurality of distributing conduits or passages separately or into all of such plurality of conduits or passages simultaneously; and an additional object of the invention is to provide in such a distributing system means for controlling the flow of material from the material hoppers or sources into the common passage to proportion the material fed into the common passage from the material hoppers or sources and selectively to cut off the flow of material from one or another of the hoppers as may be desired.

Fig. 1 is an elevational view of a portion of a pea canning plant adapted for supplying peas from a plurality of sources to a carrying flume adapted to convey the peas to the canning operations.

Fig. 2 is a detailed sectional view taken on the line 2—2 of Fig. 1.

Fig. 3 is an enlarged cross-section taken centrally through the flume valve and conduit shown in Fig. 2 and illustrating the double conduit system.

Fig. 4 is a sectional view taken centrally through a flume control valve for a single conduit system.

Fig. 5 is a sectional view taken centrally through the flume control valve for a triple conduit system.

For purposes of exemplification and not limitation, we have illustrated the principles of the process and apparatus as applied to a system adapted for distributing peas to a pea canning plant. It is obvious, however, that this invention is equally adaptable to the processing of fruits and vegetables or any other material capable of being transported in fluid media. The invention is particularly applicable to the processing of mixed vegetables for soups and for salads, such for instance as peas, corn, green beans, wax beans, diced beets, diced carrots, diced turnips, diced potatoes, chopped celery, and also for mixed fruits, diced fruits, etc., such as diced fruits for cocktails.

As is well known in pea canning plants, it is preferable to elevate the peas by suitable elevators, hydraulic or otherwise, and to store the peas in bins or tanks at such elevation. There are a number of such bins in a plant, the number depending upon the capacity of the plant which likewise determines the number of pea blanchers and other pea treating apparatuses and canning devices. In such canning plants, the peas in each one of the storage bins or hoppers may be of an arbitrarily selected species, that is, the peas may be No. 1's, No. 2's, No. 3's, etc., or they may be June peas or Alaska peas or other varieties. Sometimes ungraded peas may be stored but this is unusual. In general each bin or storage hopper is limited to one grade, size, quality or kind of pea. This of course will apply to any other commodity to which the invention is applicable.

In general in a canning plant it is customary to run through the blanchers or other apparatus but one variety of peas and one grade thereof. To this end, therefore, the plant generally runs through a series of apparatus, called a line, all of one variety of peas on hand or a selected quantity of such peas. To do so it is necessary to discharge the selected stock from one or more of the storage bins, the feed line from the bins to the blancher or other apparatus being given over to the transportation of such selected type or quality of peas and the apparatus beyond the blancher being confined to that particular quality of peas in that particular run, hence that particular line cannot be used for any other run of a different type, quality or size of peas or other material.

However, in a pea canning plant installed with the instant invention, any peas or other material from any particular storage bin or bins may be fed or discharged into one or more of a plurality of flumes for conveying the material to a point to be processed, even though the particular flume which ordinarily receives the material from such bin or bins is already in use. The invention also possesses particular advantage in instances where a plurality of types, grades, sizes or kinds of material from different bins are to be intermixed, as for instance when processing mixed fruits or vegetables or diced fruits or vegetables commonly used in making groups, salads, cocktails, and the like.

In order more clearly to explain the invention, reference is made to Figure 1 of the drawing wherein a pair of hoppers 50 and 52 are adapted to receive and contain peas of graded size, character or quality. For example, the relatively large peas may be contained in hopper 52 and relatively smaller peas in hopper 50, any number of hoppers being provided in accordance with the grades of raw material desired. The peas are generally stored in the individual storage hoppers such as 50 and 52 until they are ready to be put through a run and filled into cans or other containers. It is obvious that in some plants it is desired to provide for the handling of different kinds as well as sizes of peas or other commodities to be processed. For instance, it may be desired to supply graded early June peas either in admixture or alternative to a supply of Alaska peas. In such a case the different types of peas may be disposed in parallel, as clearly illustrated in Fig. 2 and which illustrates how hopper 50 is arranged opposite an adjacent hopper 50a, it being obvious that hopper 52 will be opposed to a hopper corresponding to hopper 50a, and so on.

Thus any combination or multiple of graders arranged in parallel series of graders may be used to discharge into suitable storage hoppers arranged in series along each flow line.

Means is provided for interconnecting the corresponding storage hoppers of the separate parallel lines of hoppers, as for example the hoppers 50 and 50A, Figure 2, with one or more distributing conduits or flow lines. When more than one flow line is used they are preferably arranged in parallel as shown in various figures of the drawing. For instance, in Figure 2, two such flow lines are shown and in that arrangement the contents of the two hoppers 50 and 52A are connected so that in conjunction with certain intervening distributing members, hereinafter described, the contents of both and/or either hopper may be fed, discharged, or distributed into one or the other, and in some instances both, of the parallel conduits, flumes or flow lines.

A plurality of flume valves, one or a plurality for each pair of hoppers shown in Figures 2, 3 and 4 may be provided for discharging or diverting the contents of the storage hoppers into the flumes as hereinafter more fully set forth. Various flumes which receive the material, in the present instance peas, from the storage hoppers, are arranged in parallel and closely adjacent to one another and are adapted to have water or other appropriate liquid flow therethrough for the purpose of carrying peas and other material. In some instances complete admixture of various ingredients may be effected in, and transported by, the flumes when more than one type of material is distributed into a common flume from a plurality of sources.

A supply fluid, preferably water, is passed from any suitable source through pipes 62 and into the flumes 64, as shown, each pipe 62 preferably discharging into one of the flumes.

The water which passes through each pipe 62 and into the flume 64 as shown in Figure 1, is controlled by a flume valve 66 which governs the flow from a relatively small storage hopper 68 hereinafter referred to. Each flume 64 then passes through a series of flume valve connections of the type shown in Figures 2 and 3. A flume 70 parallel to the flume 64, as shown in Figures 2 and 3 passes through the same flume valve connections. It will be understood that in the arrangement shown in Figures 1 to 3 the two parallel flumes 64 and 70 will accommodate all of the material which passes through the two parallel lines of storage hoppers, it being understood that any multiple arrangement of this particular layout may be used as desired. The particular type of flume valve which we have selected for use in connection with the layout shown in Figures 1 and 2 is illustrated in Figure 3 and preferably but not necessarily comprises a substantially Y-shaped fitting 72 having a central partition 74 extending from the junction 76 of the Y downwardly to the point 78 thereby dividing the fitting medially. On opposite sides of the fitting there are conduit connections 80 and 82. The conduit connection 80 connects with a pipe 84 into which discharges a storage hopper, such as the hopper 50 of Figure 2, and the conduit connection 82 connects with a pipe 86 into which discharges the corresponding storage hopper of the parallel series of hoppers, such as the hopper 50A of Figure 2.

The Y-shaped fitting is provided with a lower casing 88 which connects with the mouth of the fitting 72. This casing is adapted to receive the conduits 64 and 70. The upper part of this casing is preferably formed as a box 89, the inner central wall of which is preferably formed as a substantially inverted V-shaped baffle 92, the vertex of the V being directly in line with the bottom of the central partition 74. Intermediate the vertex portion of this V and the bottom 78 there is provided an angularly adjustable valve or gate 90 adapted to pivot about the axis 93 and controlled by an adjustable member 95 on the outside of the box. This valve 90 may be set at any adjustable position between. In the central position it forms a continuation of the center partition 74 and in the extreme positions it forms a continuation of opposed inwardly extending partition members 94 and 96. These partition members in connection with the valve 90 selectively form continuous walls to deflect the contents of the hoppers into one or the other flume or conduit and likewise to prevent the contents of the hoppers from flowing into the flume or conduit covered by the valve 90. For instance, when the valve 90 is set to form an extension of the partition 94 the contents of the two hoppers will be discharged only into the flume 64 and the entrance to flume 70 will be completely closed. In a similar manner when the valve 90 is set to form an extension of the partition 96, the contents of the two hoppers will be discharged into flume 70 and flume 64 will be completely closed. In the intermediate positions, between the partitions 94 and 96, the valve will accurately and minutely control the proportionate volumes of material which each hopper will deliver to one or more of the flumes as will be apparent from an inspection of the drawings.

In the central position in alignment with the partition 74, the valve will prevent admixture of the contents of the two hoppers and direct each into its flume 64 or 70, respectively.

Means is provided for adjustably controlling the volume of material which thus may be discharged into either flume 64 and 70. In the preferred form of such means illustrated in the drawing, each flume at its entrance in the casing box 89 is provided with a swingable valve, 98 for flume 64 and 100 for flume 70. Valve 98 is pivoted about an axis 102 and valve 100 is pivoted about an axis 104. These valves are controlled by manually adjustable screws 106 and 108, each of which when screwed in will swing its associated valve toward the slanting partition wall 92 to thereby vary the opening in the passage between the flume 64 or 70 and the casing box 89 into which the material from either one or both of the conduits 80 or 82 may be flowing. The force of the discharging material will continually urge the valves to open position, the adjusting means constituting an adjustable button or stop. If desired, any type of means for adjusting these valves may be utilized.

In the foregoing manner, means is provided whereby an even, regulated flow of material to a flume or flumes from one or the other or both of the hoppers is provided and whereby each flume may feed this regulated flow to a blancher or other device in a manner to maintain a constant, steady flow of predetermined volume.

In Figure 4 a modification is illustrated wherein a single flume control valve discharges or distributes the contents of two hoppers into a single flume. In this instance, the flume valve 144 is provided with opposed partition walls 146 and 148 cooperating with the centrally disposed, swingable valve 150 pivoting about an axis 152. The valve 150 is, preferably, adapted to be adjusted to three positions, i. e., the central position wherein both of the hoppers discharge into the single flume 154, and in the extreme positions where the flume valve 150 cooperates with the wall portion 146 or 148 to close the line from one hopper and to open the line from the other hopper whereby material from either hopper or from both hoppers may be discharged into flume 154. In this construction, means is provided for adjustably regulating the amount and rate of flow of material discharged from one or the other or from both of the hoppers into the flume 154. In this instance, the casing 156 of the flume valve is provided with two inwardly extending partition walls 160 and 158 beneath which are pivoted two gates 162 and 164 which, in cooperation with threaded adjustable members 166 and 168, serve to adjustably control the flow of material into the flume. The gate valves 162 and 164 may be projected inwardly to closed position or to various positions intermediate the closed or open positions whereby to adjustably control the flow of material to the flume 154.

In Figure 5 is shown another modified arrangement of flume valves for accomplishing a distribution from a hopper line 170 and another hopper line 172 into three separate flumes 174, 176, and 178. In this arrangement a flume valve 180 is pivoted as at 182 in the substantially Y-shaped casting and may be swung into the central position or into one or the other extreme positions shown in dotted lines whereby to permit material to flow from one or the other or both of the hoppers into the main passage 184 of this flume valve.

The passage 184 in turn connects with an enlarged fitting 186 providing discharge passageways 188, 190, and 192 connecting with the separate flumes 174, 176, and 178 respectively. In this fitting 186 is provided two adjustably swingable valves 194 and 196 pivoted about axes 198 and 200. The valve 194 is adapted to be adjustably shifted from a full line position as shown in Figure 5, where it abuts a side wall 202 of the fitting, to an extreme dotted line position where it abuts the side of the valve 196. For this purpose the end of the valve 194 is made slightly tapering to provide a nice contact at this point.

In the same way valve 196 may be adjusted from a position against the side wall 204 of the fitting 186 into an extreme position against the side of the valve 194. The end of the valve 196, similarly to the end of the valve 194, is made slightly tapering to provide a nice contact at this point. In the full line positions shown in Figure 5, valve 194 completely closes passage 188 leading to flume 174 but opens the passage 190 and the valve 196 completely closes the passage 192 but opens the passage 190. In this position, the contents of one or the other or both hopper flow lines 170 and 172, depending on the adjustment of the valve 180, are discharged into the flume 176.

In other adjustments, the contents of one or the other or both flow lines 170 or 172 may be discharged either into the flume 174 or the flume 178. In an intermediate position, the two valves 194 and 196 may have their ends abut centrally of the fitting 186 whereby to completely close the flume 176 but to divert the material into the two end flumes 174 and 178. While we prefer not to use this adjustment of the valves 194 and 196 it is within the contemplation of the invention to provide such intermediate adjustments. The two gate valves 194 and 196 may receive other intermediate adjustments whereby all three flume lines 174, 176, and 178 are simultaneously fed. However, it is preferred not to use this setting.

In this construction means is also provided for adjustably controlling and regulating the volume of material flowing through each of the passageways 188, 190, and 192. This is provided by means of a butterfly type of valve, or any other type of valve, placed as shown at 206, 208, and 210 respectively.

It will thus be seen that there is provided a complete system for distributing materials from one or more sources to a plurality of different points for different processing operations and in particular for the distribution and preparation of peas in a pea canning plant. The invention enables peas to be fed or distributed in a flexible manner so that when one of the distributing flumes is being used to convey one type, selection or grade of peas, the peas or material from the other hoppers may be discharged or diverted into those flumes which are not in use and wherein either peas of a single type, quality or grade may be fed through a single flume from one or more storage bins or peas of various type, quality, grade, or size from a plurality of storage bins may be mixed in a single flume line.

The water or liquid carrier which may be heated serves to cleanse and mix the peas, or cleanse the peas when a single type is fed, and the flume valves adjustably control an even, regulated volume of material to the desired point thereby eliminating all surges of material through the feed lines. The feed lines are closed flumes and therefore eliminate the possibility of any of the liquid or the material carried thereby from going over into the plant as in the case of an open carrier system. The cleaning of the peas is also most effectively promoted by the closed flumes.

One of the most striking features of the invention is the flexibility of the system, which must be apparent from even a cursory inspection of the drawing, producing an even and mathematically precise flow of desired materials along each line and to and through each blancher whereby the utmost efficiency may be attained and whereby also the contents of any particular storage hopper or bin may be discharged evenly and at a controlled rate into a plurality of conduits without danger of clogging any of the conduits through which the material is flowing.

It is thought that the invention and numerous of its attendant advantages will be understood from the foregoing description and it is obvious that numerous changes may be made in the form, construction and arrangement of the several parts without departing from the spirit or scope of the invention, or sacrificing any of its attendant advantages, the form herein described being a preferred embodiment for the purpose of illustrating the invention.

What is claimed as new and is desired to be secured by Letters Patent of the United States is:

1. In an apparatus for the distribution of solid materials, the combination of means forming two independent sources of material, means forming a single closed flume through which liquid is adapted to flow under pressure, means for feeding materials from said sources laterally into said flow of liquid in the flume, said means comprising conduits in permanent delivery relationship with the said sources and said flume, valve means adjacent the flume for controlling the total feed of material to the flume from either source to said flume or from both sources simultaneously to said flume, and an angularly movable valve plate for varying the proportionate part fed from one source inversely with respect to the proportionate part fed from the other source, and means for adjustably controlling the volume of feed per unit of time from either of said sources or from both.

2. In an apparatus for distributing solid materials, the combination of means forming two sources of material, means forming three independent closed flumes through which liquid is adapted to flow under pressure, means for feeding materials from said sources into said flumes, said means comprising valves for directing material from either of said sources or simultaneously from both of said sources to any one of said flumes alone, or to any combination of two of said flumes or to all three of said flumes simultaneously, said feeding means being adapted to feed said material from said independent sources intermediate of said independent flumes in order to introduce the materials laterally into said flow of liquid.

3. In an apparatus for distributing solid materials, the combination of means forming two sources of material, means forming three independent closed flumes through which liquid is adapted to flow under pressure, means for feeding materials from said sources into said flumes, said means comprising valves for directing material from either of said sources or simultaneously from both of said sources to any one of said flumes alone, or to any combination of two of said flumes or to all three of said flumes simultaneously, and means for independently controlling the rate of flow of material to each of said flumes, said feeding means being adapted to feed said material from said independent sources intermediate of said independent flumes in order to introduce the materials laterally into said flow of liquid.

4. In an apparatus for feeding solid material, the combination of means forming two independent reservoirs of material, means providing a Y-fitting, one leg of which is in permanent delivery association with each source, means forming two closed flumes associated with said fitting, said fitting including a valve pivoted in a plane bisecting the legs of said fitting and shiftable from a central position angularly to either side thereof to selectively close off said legs, additional manually operable valves in said fitting for selectively directing materials passing said first valve into either of said flumes separately or into both of said flumes simultaneously, and means between each of said last mentioned valves and its corresponding flume for individually controlling the rate of flow of material into said flumes.

5. An apparatus for distributing food materials comprising a pair of sources of such material, a pair of independent closed flumes, means for connecting said pair of sources to said flumes to supply food materials to flumes, said means comprising a pipe fitting having a pair of intersecting inlet passages connected to said sources, a pair of intersecting outlet passages connected to said flumes, and a common passage between said inlet and outlet passages, a valve at the intersection of said inlet passages for selectively directing the materials from either of said sources or from both of said sources simultaneously into said common passage, and a valve mechanism at the intersection of the adjacent outlet passages for selectively directing materials from said common passage into any one of said outlet passages separately or to said outlet passages simultaneously.

6. An apparatus for distributing food materials comprising a pair of sources of such material, a pair of independent closed flumes, means for connecting said pair of sources to said flumes to supply food materials to flumes, said means comprising a pipe fitting having a pair of intersecting inlet passages connected to said sources, a pair of intersecting outlet passages connected to said flumes, and a common passage between said inlet and outlet passages, a valve at the intersection of said inlet passages for selectively directing the materials from either of said sources or from both of said sources simultaneously into said common passage, a valve mechanism at the intersection of the adjacent outlet passages for selectively directing materials from said common passage into any one of said outlet passages separately or to said outlet passages simultaneously, and means comprising an adjustable member in each of said outlet passages for determining the proportionate amount and the rate of flow of material fed into each flume.

MEAD S. CARMICHAEL.
GEORGE CARMICHAEL.